United States Patent [19]
Allen et al.

[11] 4,140,280
[45] Feb. 20, 1979

[54] PORTABLE HAND-HELD, MANUALLY-OPERATED DUSTER

[75] Inventors: Francis F. Allen, Lakeview, Oreg.; James C. Nichol, Orinda, Calif.

[73] Assignee: Bermuda Research Corp., San Francisco, Calif.

[21] Appl. No.: 734,731

[22] Filed: Oct. 22, 1976

[51] Int. Cl.² .............................................. A01C 15/02
[52] U.S. Cl. .................................. 239/654; 74/606 A; 222/193
[58] Field of Search ......................... 239/654; 222/193; 74/606 R, 606 A; 308/DIG. 7, DIG. 8

[56] References Cited
U.S. PATENT DOCUMENTS

| | | | |
|---|---|---|---|
| 1,551,877 | 9/1925 | Henning | 239/654 |
| 2,206,876 | 7/1940 | Chater | 222/193 X |
| 2,315,317 | 3/1943 | Copp et al. | 74/606 A X |
| 2,481,914 | 9/1949 | Eastman et al. | 74/606 A |
| 2,892,286 | 6/1959 | Martin | 222/193 |
| 3,330,445 | 7/1967 | Love, Jr. | 222/193 |

FOREIGN PATENT DOCUMENTS 850756  10/1960  United Kingdom ............. 308/DIG. 7

*Primary Examiner*—John J. Love
*Assistant Examiner*—Michael J. Forman
*Attorney, Agent, or Firm*—Warren, Chickering & Grunewald

[57] ABSTRACT

A hand-held, manually-operated duster for propelling a controlled stream of pulverulent material, such as an insecticide dust, onto vegetables, roses, flowers, shrubs and small trees and the like and which comprises a unitary housing providing a material hopper and separate impeller and drive chambers, a rotary impeller being mounted in the impeller chamber and a hand crank and gear train being mounted in or associated with the drive chamber and connected to the impeller, powder being fed from the hopper to the impeller for discharge in a controlled stream.

2 Claims, 9 Drawing Figures

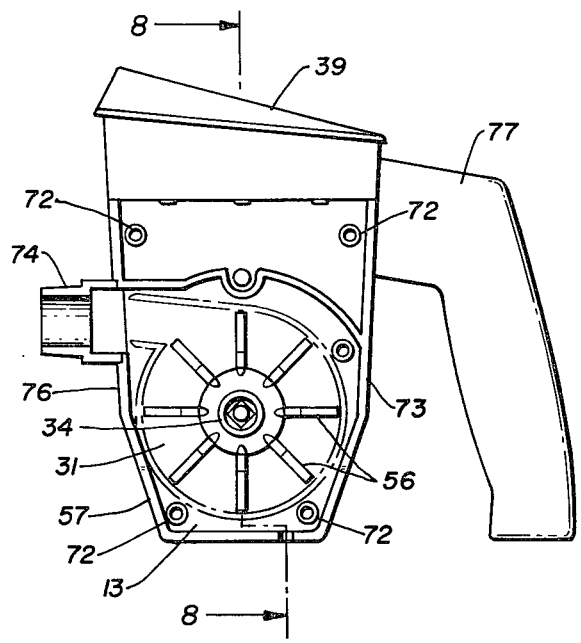
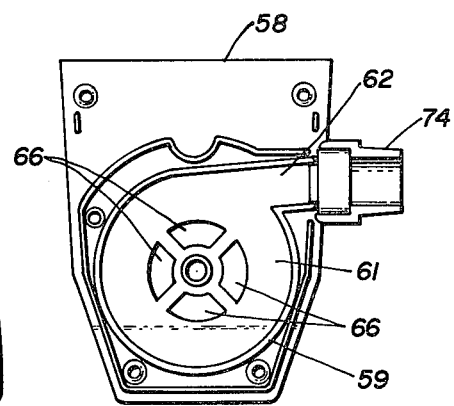
Fig. 6
Fig. 7
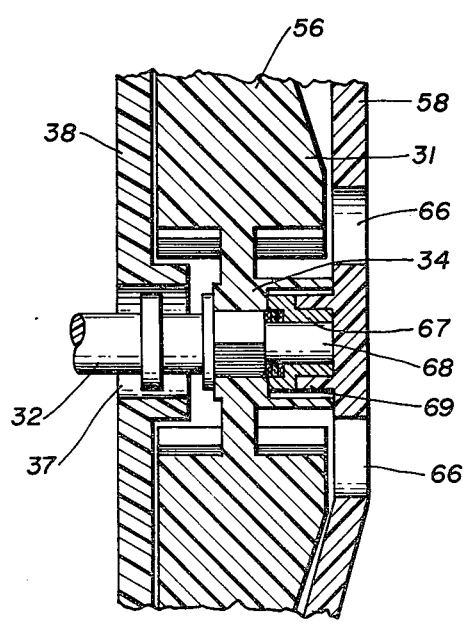
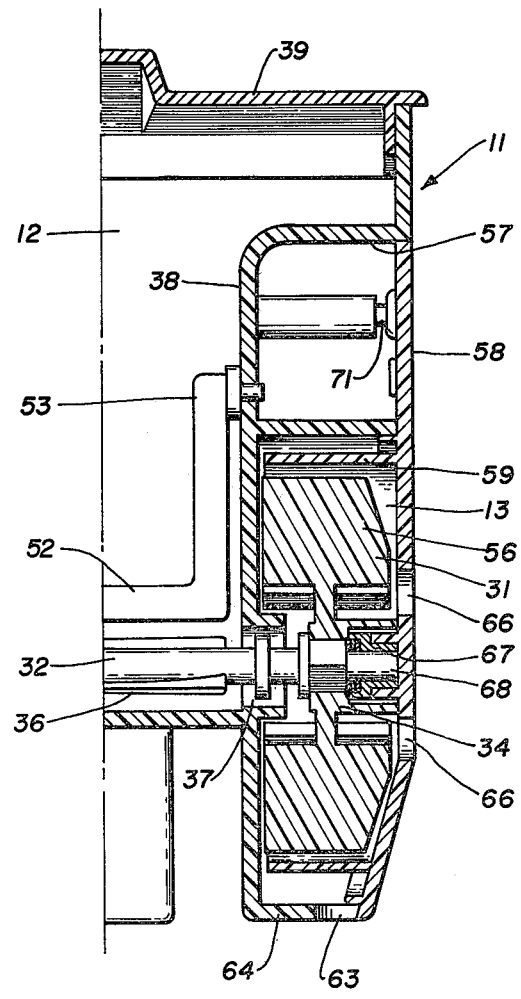
Fig. 9
Fig. 8

4,140,280

PORTABLE HAND-HELD, MANUALLY-OPERATED DUSTER

BACKGROUND OF THE INVENTION

The invention relates to apparatus used by gardeners and, particularly, home gardeners, and commonly referred to as dusters for spraying of insecticidal garden dust or powders onto growing plants, bushes, shrubs and the like. The present application presents specific improvements on a hand duster disclosed in U.S. Pat. No. 3,330,445.

It has been proposed, see U.S. Pat. No. 3,330,445, to combine in a lightweight, portable, hand-operated duster a material hopper for the pulverulent material, a high-speed rotary impeller for propelling the material in a controlled stream for dusting plants and the like, and a manually-operated crank and gear train connected to the impeller for generating the required high-speed rotation thereof. One of the problems encountered is overheating and deterioration of certain high-speed parts. Another problem encountered is that the garden dusts are exceedingly fine and will penetrate and infiltrate bearings, gears and other moving parts and are, at the same time, highly abrasive and, accordingly, abrade and destroy critical moving parts and cause early and premature failure of the structure. Also, certain garden dusts absorb moisture and harden. An uncontrolled build-up of such material in the impeller chamber may break up the impeller.

SUMMARY OF THE INVENTION

An object of the present invention is to provide a portable, hand-held, manually-operated duster of the character described which is self-ventilating and constantly self-cleaning in those sensitive areas affected by the uncontrollable entry of the garden dust being used, and which will function to constantly move out dust entering critical operational areas, with the result that the high-speed parts are protected from the deleterious accumulation of the abrasive and self-hardening action of the garden dust being dispersed.

Another object of the present invention is to provide a garden duster of the character described having improved bearing structures for certain of the sensitive high-speed moving parts, thereby obtaining a heretofore not attainable dependability and satisfactory long life for the apparatus.

The invention possesses other objects and features of advantage, some of which, with the foregoing, will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

BRIEF DESCRIPTION OF THE DRAWINGS

FIG. 6 is an opposite side elevation of the device with the opposite side plate removed.

FIG. 7 is a side elevation of the side plate removed in the showing of FIG. 6.

FIG. 8 is a cross-sectional view on an enlarged scale taken substantially on the plane of line 8—8 of FIG. 6.

FIG. 9 is a fragmentary cross-sectional view on a further enlarged scale of a portion of the structure shown in FIG. 8.

DETAILED DESCRIPTION OF INVENTION

Figure 1:
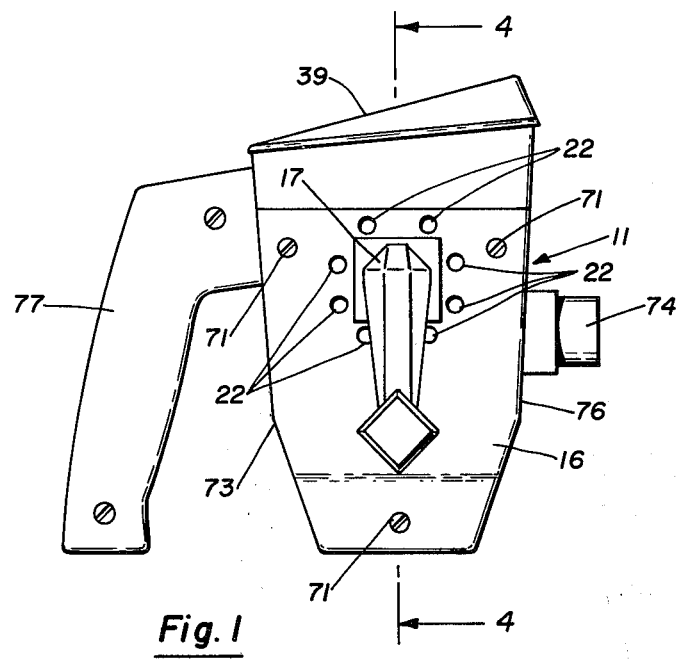
FIG. 1 is a side elevation of a portable, hand-held, manually-operated duster constructed in accordance with the present invention.
Figure 3:
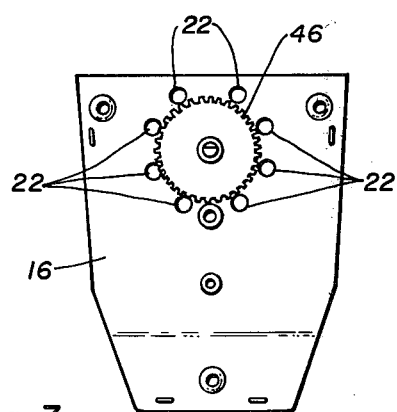
FIG. 3 is a side elevation of the side plate removed in the showing of FIG. 2.
Figure 2:
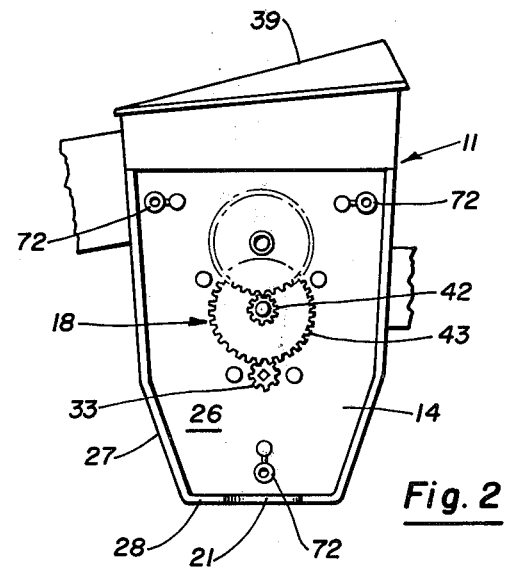
FIG. 2 is a fragmentary side elevation of the duster with a side plate removed.

The duster of the present invention comprises, briefly, a housing 11 providing a material hopper 12 and impeller and drive chambers 13 and 14, here positioned on opposite sides of hopper 12; a closure plate 16 for drive chamber 14; a manually engageable crank 17, journalled for rotation on plate 16; a gear train 18 in drive chamber 14 connected to crank 17; one of the improvements of the present invention comprising vent openings 21 and 22 formed in the base and side of the drive chamber for circulating cool air through the drive chamber and freeing it from pulverulent material entering therein. As will be best seen from FIG. 4, plate 16 is formed with a bearing opening 23, for the shaft 24 of crank 17, and the side vent 22 for the chamber is provided by a plurality of circumferentially spaced openings 22 surrounding bearing 23, see FIGS. 1 and 3.

Figure 4:
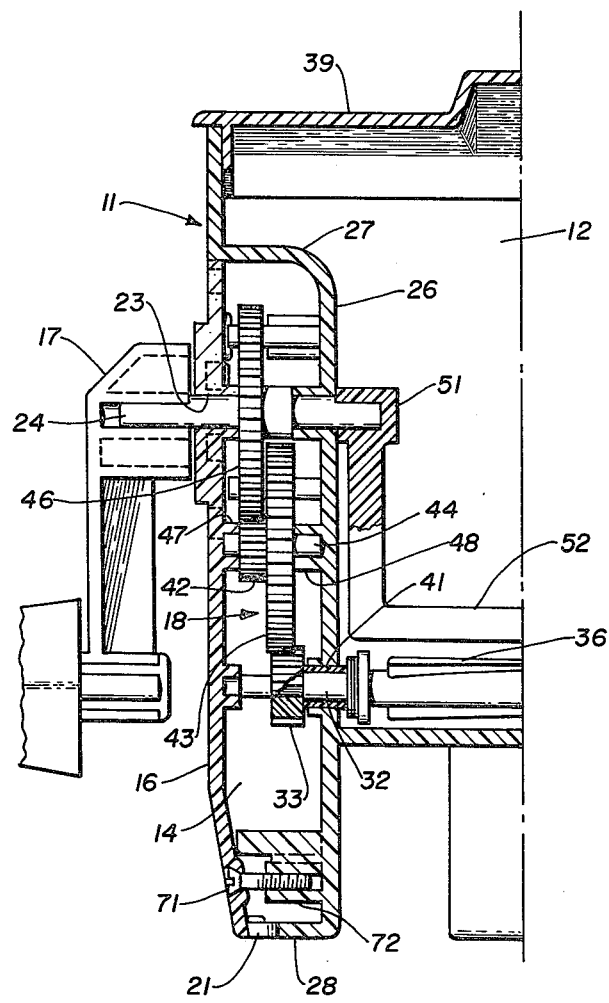
FIG. 4 is a cross-sectional view on an enlarged scale taken substantially on the plane of line 4—4 of FIG. 1.

As will also best be seen in FIG. 4, housing 11 is formed with an interior wall 26 defining one side of hopper 12 and the interior side of drive chamber 14, and which is normally positioned in a substantially vertical plane in the operation of the duster, and an integral annular, laterally-extending peripheral wall 27 surrounding the drive chamber and against which closure plate 16 is mounted to enclose the chamber; and opening 21 is here formed in the normally bottom side 28 of peripheral wall 27 at the bottom of drive chamber 14. Accordingly, any of the garden dust finding its way into the drive chamber from hopper 12 may gravitate out of opening 21. Moreover, in the operation of the device, the whirling action of the gear train establishes an air current or flow through the chamber by way of openings 21 and 22 so as to constantly establish a stream of cooling air through the drive chamber and to move out any dust entering this critical operational area.

Figure 5:
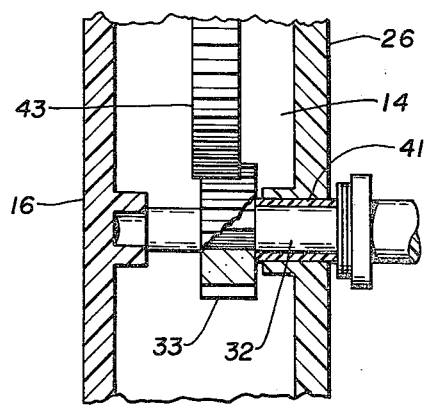
FIG. 5 is a fragmentary cross-sectional view on a further enlarged scale of a portion of the mechanism illustrated in FIG. 4.

The function of gear train 18 is to convert a comfortably fast rotation of crank 17 into a high-speed rotation of impeller 31, positioned in chamber 13. This is here accomplished by a shaft 32, which connects the small terminal high-speed driven gear 33 of the gear train with the hub 34 of impeller 31, shaft 32 here extending between chambers 13 and 14 straight across the bottom of the hopper 12. Vanes 36 are formed on shaft 32 in the hopper chamber for transporting the garden dust laterally through an opening 37 surrounding shaft 32 in an interior wall 38 dividing the hopper compartment from impeller chamber 13 so as to deliver the garden dust to the eye of impeller 31. As a feature of the present construction, the major portions of the duster, including housing 11, a lid 39 capping the hopper compartment 12, crank 17, shafts 24 and 32, and all of the gears making up the gear train, are formed of plastic materials selected to provide necessary strength, anti-corrosion qualities, and being capable of injection molding. The critical working parts, including the gears, shafts and impellers, are preferably constructed of a composite plastic comprising glass-filled nylon (about 10% glass fiber) and about 5% polytetrafluoroethylene commonly sold under the trademark Teflon. The housing and associated nonworking parts may be formed of polypropylene. One of the critical areas is the proper support of shaft 32 and its attached gear 33 for the stresses and high-speed operation to which these parts are subjected. It has been found that the required strength, durability, and low-friction support for shaft 32 may be obtained by journalling the shaft in a Teflon bearing 41 mounted in interior wall 26, see FIGS. 4 and 5.

Another and important structural improvement of the present invention is the support provided for a pair of intermediate gears 42 and 43, which are preferably molded as a one-piece construction and, in any event, connected for joint rotation on a common shaft 44, gear 43 being enmeshed with and driving gear 33, and gear 32 being enmeshed with and driven by gear 46, carried by crank shaft 24. As here best seen in FIG. 4, shaft 44 is made of brass and is carried at its opposite ends in bearings 47 and 48, formed in confronting relation on plate 16 and interior wall 26. The journalling of brass shaft 44 in plastic bearings 47 and 48 provides an important improvement in strength, wear resistance, precision of operation, and low friction.

The internal end of crank shaft 24 is preferably carried through wall 26, see FIG. 4, and is connected to the hub 51 of a dust-stirring member 52, which is rotated by the crank within hopper chamber 12 for keeping the powder in a loose, flowable condition, it being noted from FIG. 8 that the opposite end 53 of member 52 is journalled for rotation in an opening provided in interior wall 38 at the opposite side of the hopper chamber.

Another feature of the present invention is the provision of an improved support for the impeller 31 and means to prevent the accumulation and build-up of dust in the impeller chamber. Although it is recommended that the apparatus be washed with water after each use so as to flush out dust, a failure to do so in the past has permitted a build-up of dust in the impeller chamber. Many types of dust will absorb water and harden. A solid bridge may thus form across the bottom of the impeller chamber which will impact and break the impeller blades or vanes 56, with the resultant failure of the device.

With reference to FIGS. 6–8, it will be noted that interior wall 38 partitioning the hopper and impeller chambers is formed with an integral, laterally-extending, peripheral wall 57, and a plate 58 is mounted on wall 57 to enclose the impeller chamber and is, in turn, formed with a lateral wall 59 surrounding vanes 56 and providing a squirrel cage chamber 61 therefor, having a discharge passage 62 for the garden dust driven by the impeller. As an important feature of the present construction, peripheral wall 57 is formed with an opening 63 in the normally lower end 64 thereof, which effectively prevents the accumulation of material within and bridging the lower section of the squirrel cage chamber. Plate 58 also provides an outboard bearing for shaft 32 and is formed with a plurality of circumferentially spaced openings 66 surrounding the axis of shaft 32 for admitting air into the impeller chamber at the base of vanes 56 for aerating the garden dust drawn through opening 37 and for admixing with and transporting the dust out of discharge opening 62.

The outboard bearing for shaft 32 has been another critical structural area causing premature failure of the present device. This problem has been solved by using a brass bearing 67 for the cylindrical outboard end 68 of shaft 32. As here shown, bearing 67 comprises a brass sleeve, which is carried in a surrounding shoulder 69 formed on plate 58 and which positions the bearing in axial alignment with shaft 32 for receiving and journalling shaft end 68.

Closure plates 16 and 58 may be secured in place by screws 71 threaded into bosses 72 formed on interior walls 26 and 38. A handle 77 is mounted on the normally rear wall 73 of housing 11 for convenient manual support in one hand of the user while the other hand is engaged with crank 17. A fitting 74 is mounted at the normally forward side 76 of housing 11 for receipt of one or more spray extension tubes (not shown).

What is claimed is:

1. A portable hand-held manually operated duster for propelling a controlled stream of pulverulent material comprising:

a housing providing a material hopper and impeller and drive chambers, said impeller and drive chambers being positioned in substantially vertical planes in the normal position of use of the duster;

said housing providing an interior wall for said drive chamber having a normal position of use in a substantially vertical plane;

a side-mounted, vertically disposed closure plate for said drive chamber;

a manually engageable crank having a shaft journalled for rotation on said plate;

a gear train in said drive chamber connected to said crank and composed of a plurality of molded plastic enmeshed speed multiplication gears and terminating in a high speed driven gear disposed at the normally lower end of said gear train and including a pair of intermediate gears connected for joint rotation about a common axis, one of said intermediate gears being enmeshed with and driving said high speed driven gear;

said interior wall and plate providing bearings on said axis;

a metallic shaft supporting said intermediate gears and journalled in said bearings;

an impeller mounted for rotation in said impeller chamber;

a molded plastic shaft supporting and fixed for rotation with said high speed gear and extending through said interior wall and connected to said impeller;

said plate providing a bearing supporting one end of said last-named shaft;

a Teflon bearing mounted in said interior wall and journalling said last-named shaft; and said housing being formed with an air inlet opening adjacent the base of said drive chamber; and said plate being formed with a bearing journalling said crank shaft at the normally upper end of said gear train, said plate being formed with a plurality of discharge openings disposed in circumferentially spaced relation around said bearing adjacent the upper end of said drive chamber and providing air discharge passages extending from said drive chamber to the atmosphere for inducing a flow of air cooling said gear train and freeing said drive chamber from pulverulent material entering therein.

2. The apparatus of claim 1, said housing having a second vertically disposed interior wall defining in part said impeller chamber, said second wall being formed with an integral laterally extending peripheral wall;

said impeller having a hub and a plurality of radial vanes with said hub mounted on said plastic shaft for rotation therewith in a substantially vertical plane in position of use;

a second side-mounted vertically disposed plate mounted on said peripheral wall and enclosing said impeller chamber and having a lateral wall surrounding said impeller vanes and extending substantially to said second interior wall and providing a squirrel cage chamber around said impeller, said lateral wall having a discharge passage for pulverulent material driven by said impeller;

said peripheral wall having an opening therein in the normally lower end thereof to prevent the accumulation of material bridging a lower section of said squirrel cage chamber; and an abrasion-resistant bearing mounted on said second plate and journalling the opposite end of said plastic shaft.

* * * * *